(12) United States Patent
Norimatsu et al.

(10) Patent No.: US 7,766,032 B2
(45) Date of Patent: Aug. 3, 2010

(54) FUEL CONTAINER FOR FUEL CELL

(75) Inventors: Yasuaki Norimatsu, Hitachinaka (JP); Tomoichi Kamo, Tokai (JP); Osamu Kubota, Hitachi (JP); Yasuaki Nakamura, Oyama (JP)

(73) Assignees: Hitachi, Ltd., Tokyo (JP); Tokai Corporation, Tokyo (JP)

( * ) Notice: Subject to any disclaimer, the term of this patent is extended or adjusted under 35 U.S.C. 154(b) by 497 days.

(21) Appl. No.: 10/586,686

(22) PCT Filed: Jan. 17, 2005

(86) PCT No.: PCT/JP2005/000488

§ 371 (c)(1), (2), (4) Date: Jul. 20, 2006

(87) PCT Pub. No.: WO2005/069419

PCT Pub. Date: Jul. 28, 2005

(65) Prior Publication Data

US 2008/0241631 A1    Oct. 2, 2008

(30) Foreign Application Priority Data

Jan. 20, 2004    (JP) .............................. 2004-011310

(51) Int. Cl.
*B67D 7/72*    (2010.01)

(52) U.S. Cl. ....................... 137/209; 222/334; 222/389; 429/34

(58) Field of Classification Search ................. 137/206, 137/209, 211.5; 222/389, 334, 386.5; 429/34
See application file for complete search history.

(56) References Cited

U.S. PATENT DOCUMENTS 4,979,652 A * 12/1990 Saulle ................... 222/402.16
5,033,940 A * 7/1991 Baumann .................... 417/273

(Continued)

FOREIGN PATENT DOCUMENTS

JP          57-185172          11/1982

(Continued)

OTHER PUBLICATIONS

Translation of International Search Report PCT/JP2005/000488.

*Primary Examiner*—Stephen Hepperle
*Assistant Examiner*—Craig M Schneider
(74) *Attorney, Agent, or Firm*—Antonelli, Terry, Stout & Kraus, LLP.

(57) ABSTRACT

A fuel container for a fuel cell, comprises a container body, the container body having a liquid fuel chamber for the storage of liquid fuel and a discharge means accommodating chamber for accommodating means for discharging the liquid fuel, a valve disposed in the container body to discharge or shut off the liquid fuel, and a partition wall member disposed slidably in the interior of the container body, wherein the partition wall member partitions the interior of the container body into the liquid fuel chamber and the discharge means accommodating chamber, the liquid fuel chamber and the discharge means accommodating chamber are in communication with each other through the partition wall member, and at least one of sliding surfaces of the container body and the partition wall member contains a material of a low frictional coefficient.

8 Claims, 6 Drawing Sheets

U.S. PATENT DOCUMENTS

2003/0019888 A1* 1/2003 Gupta ........................ 222/389
2006/0172171 A1* 8/2006 Deinzer et al. ................ 429/34

FOREIGN PATENT DOCUMENTS

| | | |
|---|---|---|
| JP | 63-190669 | 8/1988 |
| JP | 2001-093551 | 4/2001 |
| JP | 2001-313047 | 11/2001 |
| JP | 2003-109633 | 4/2003 |
| WO | WO 03/043112 A1 * | 5/2003 |

* cited by examiner

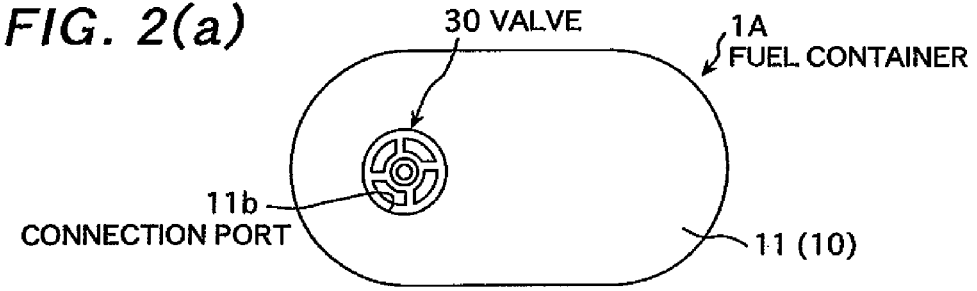
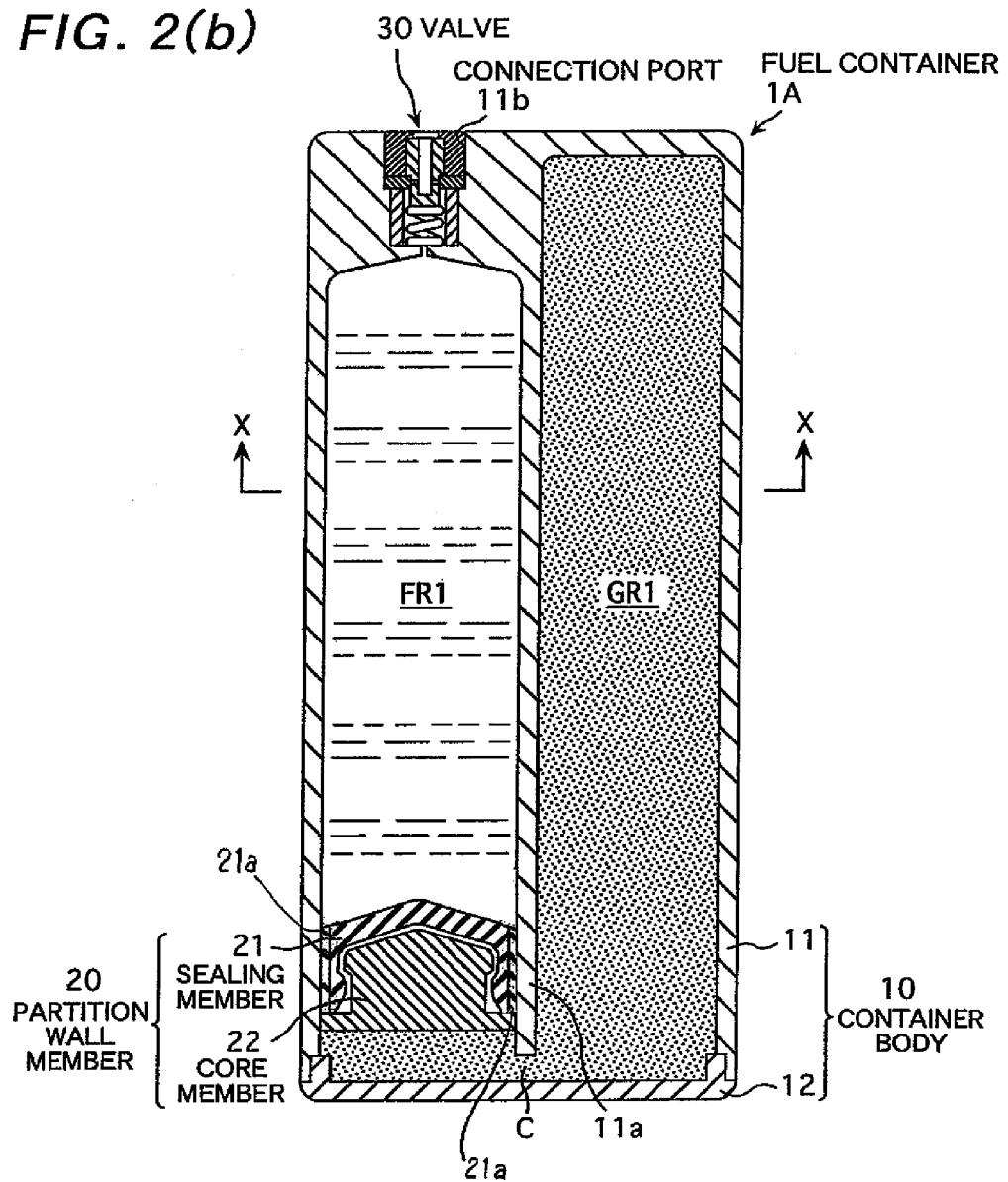

FUEL CONTAINER FOR FUEL CELL

TECHNICAL FIELD

The present invention relates to a fuel container for a fuel cell to be loaded to a device which incorporates a fuel cell such as a direct methanol fuel cell (DMFC) or a fuel container for a fuel cell to be used for the supply of liquid fuel such as an aqueous methanol solution to a fuel cell or to a fuel container installed in a fuel cell.

BACKGROUND ART

As conventional containers for storing liquid, there are known, for example, aerosol containers and cosmetic containers. These containers are formed using, for example, glass, metal, or a plastic material. In addition to the above liquid, compressed gas (so-called propellant gas) is sealed into the containers. When a nozzle of the container is opened, the liquid and the compressed gas mix together and the resulting mixture is ejected as a spray.

In the case where only the liquid is to be ejected, it has been proposed to use a container of a double structure provided with a piston, etc. (see, for example, JP-63-190669). Recently, studies have been being made about a fuel cell as a small-sized power supply in a small-sized portable remote terminal such as a notebook-size personal computer of PDA (Personal Data Assistant). As means for the supply of fuel to the fuel cell it has been proposed to use a fuel container (fuel cartridge). As the fuel to be injected into the fuel container, a liquid fuel mixture of methanol and pure water, or ethanol and pure water, is being studied for example in the case where the fuel cell is DMFC.

Small-sized devices such as a notebook-size personal computer are desired not to carry thereon a fuel supply pump, a pressure regulating mechanism and a residual fuel quantity detecting mechanism due to a restriction imposed on its size. In addition, for the improvement of convenience on the user side, it is expected to develop a less expensive, small-sized and lightweight fuel container.

Further, for ejecting liquid fuel with use of a fuel container filled with the liquid fuel, it is necessary for a piston-like partition wall member to operate positively. Particularly, in the case where a portable remote terminal is provided with neither a fuel supply pump nor a pressure regulating mechanism and the discharge pressure is set as low as 0.3 MPaG (gauge pressure) or lower, the partition wall member must move positively even at such a low discharge pressure.

Generally, in order that the piston-like partition wall member can move positively, lubricating oil such as silicone oil is applied to the peripheral surface of the partition wall member to enhance the slidability of the partition wall member.

DISCLOSURE OF THE INVENTION

Problems to be Solved by the Invention

However, there has been the problem that if lubricating oil such as silicone oil is used as referred to above, the lubricating oil dissolves out into the liquid fuel. Once the lubricating oil which is an impurity mixes into the liquid fuel, the power generating function of the fuel cell is deteriorated.

Accordingly, it is an object of the present invention to provide a fuel container for a fuel cell able to ensure a positive slidability of a partition wall member without mixing any impurity into liquid fuel and able to supply the liquid fuel.

Means for Solving the Problems

According to the present invention there is provided a fuel container for a fuel cell, comprising a container body, the container body having a liquid fuel chamber for the storage of liquid fuel and a discharge means accommodating chamber for accommodating means for discharging the liquid fuel, a valve disposed in the container body to discharge or shut off the liquid fuel, and a partition wall member disposed slidably in the interior of the container body, wherein the partition wall member partitions the interior of the container body into the liquid fuel chamber and the discharge means accommodating chamber, the liquid fuel chamber and the discharge means accommodating chamber are in communication with each other through the partition wall member, and at least one of sliding surfaces of the container body and the partition wall member contains a material of a low frictional coefficient.

It is preferable for the container body to have a connecting portion for connecting the valve to a fuel cell. It is preferable for the container body to have a connecting portion for connecting the valve to a liquid fuel container installed in a fuel cell. It is preferable for the fuel container to be constructed so as to be loaded to a device which incorporates the fuel cell.

It is preferable that the material of a low frictional coefficient be a material not dissolving out into the liquid fuel. This material may be coated onto the foregoing sliding surface. It is preferable that the material in question be polytetrafluoroethylene or diamond-like carbon.

With compressed gas stored in the discharge means accommodating chamber, a back pressure can be imparted to the partition wall member. It is preferable that the liquid fuel chamber and the compressed gas chamber be disposed adjacent each other.

Advantages of the Invention

According to the present invention it is possible to provide a fuel container for a fuel cell able to ensure a positive slidability of a partition wall member without mixing any impurity into the liquid fuel and able to supply the liquid fuel.

BRIEF DESCRIPTION OF THE DRAWINGS

FIG. 2(a) is a plan view of the fuel container and FIG. 2(b) is a centrally sectional front view of the fuel container;

FIGS. 4(a) and 4(b) illustrate on a larger scale a valve shown in FIG. 2, of which FIG. 4(a) shows a closed condition of the valve and FIG. 4(b) shows an open condition of the valve;

BEST MODE FOR CARRYING OUT THE INVENTION

Figure 1:
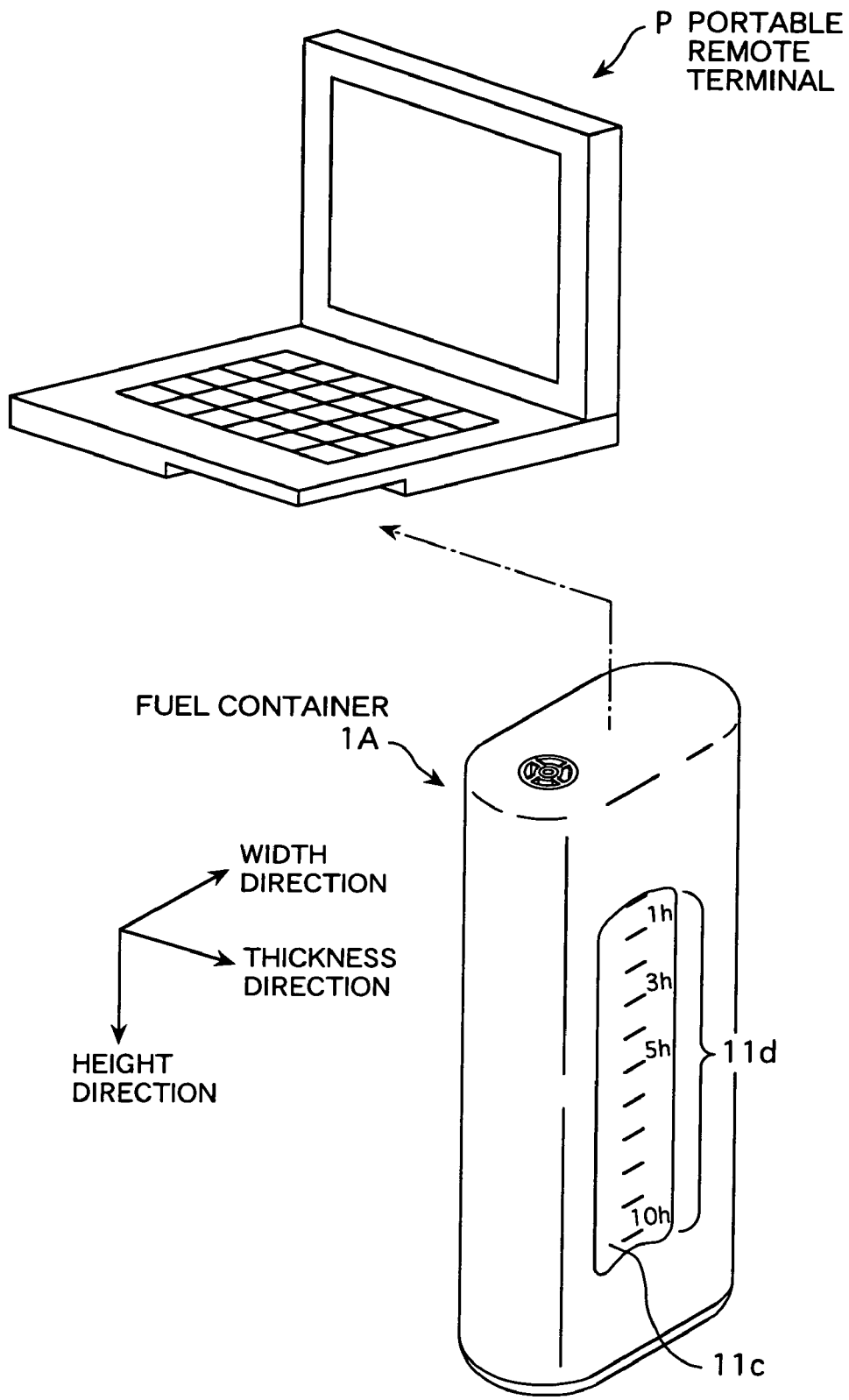
FIG. 1 illustrates a pre-mounted state of a fuel container for a fuel cell according to an embodiment of the present invention.

The fuel container according to the present invention may be loaded to a device which incorporates a fuel cell or may be used as a fuel container for the supply of liquid fuel to a fuel container installed in a fuel cell. The fuel container has a container body. The container body stores liquid fuel therein and accommodates means for forcing out or discharging the liquid fuel. The container body has a connecting portion for connection to the fuel cell. The container body is also provided with a partition wall member, which is slidable in the interior of the container body. The partition wall member partitions the interior of the container body into a liquid fuel chamber for storing the liquid fuel and a push-out means accommodating chamber in which the push-out means is accommodated. The container body is further provided with a valve disposed in the connecting portion to permit or cut off the flowing of the liquid fuel. At least one of sliding surfaces of the container body and the partition wall member contains material of a low frictional coefficient which diminishes a frictional force induced between the partition wall member and the container body with sliding of the partition wall member. Alternatively, the material of a low frictional coefficient is applied to the at least one sliding surface.

The fuel container is a fuel container 1A for a fuel cell to supply liquid fuel to the fuel cell, comprising a container body 10 which stores therein liquid fuel and compressed gas (push-out means) for forcing out the liquid fuel, the container body 10 having a connecting portion 11b for connection to a fuel cell, a partition wall member 20 which is slidable in the interior of the container body 10, the partition wall member 20 partitioning the interior of the container body 10 into a liquid fuel chamber FR1 for the storage of liquid fuel therein and a compressed gas chamber GR1 (push-out means accommodating chamber) for the storage of compressed gas therein, and a valve 30 disposed in the connection port to permit or shut off the flowing of liquid fuel. At least one of sliding surfaces of the container body 10 and the partition wall member 20 is a low friction surface which diminishes a frictional force induced between the partition wall member 20 and the container body 10 with sliding of the partition wall member 20.

According to the fuel container for a fuel cell of such a construction, since at least one of sliding surfaces of the container body and the partition wall member is a low friction surface, a frictional force which is induced between the partition wall member and the container body with sliding of the partition wall member decreases. That is, without the use of lubricating oil, it is possible to ensure a positive slidability of the partition wall member.

Besides, since lubricating oil is not used, there is no fear that lubricating oil as an impurity which deteriorates the power generating function of the fuel cell may be mixed into the liquid fuel.

An embodiment of the present invention will be described in detail hereinunder with reference to the accompanying drawings.

Figure 3:
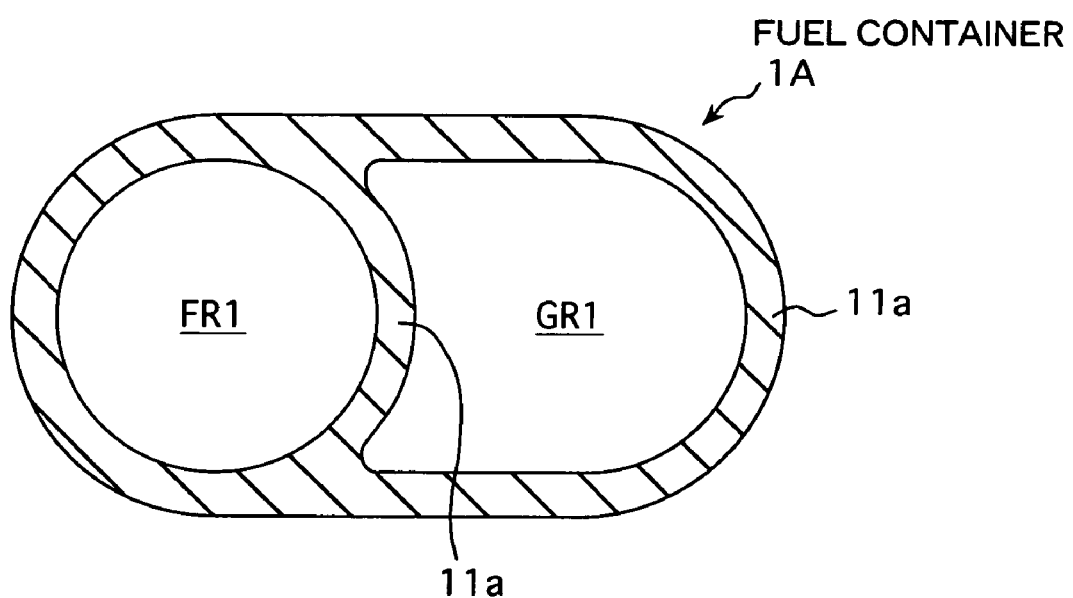
FIG. 3 is a sectional view taken on line X-X in FIG. 2(b)
Figure 4A:
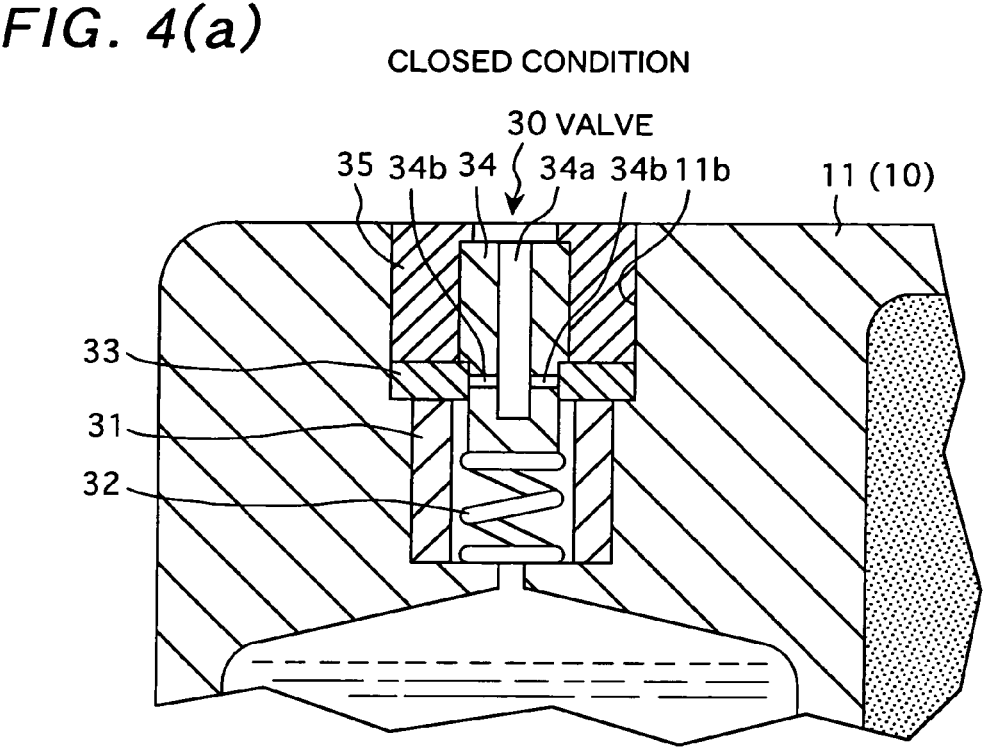
Figure 4B:
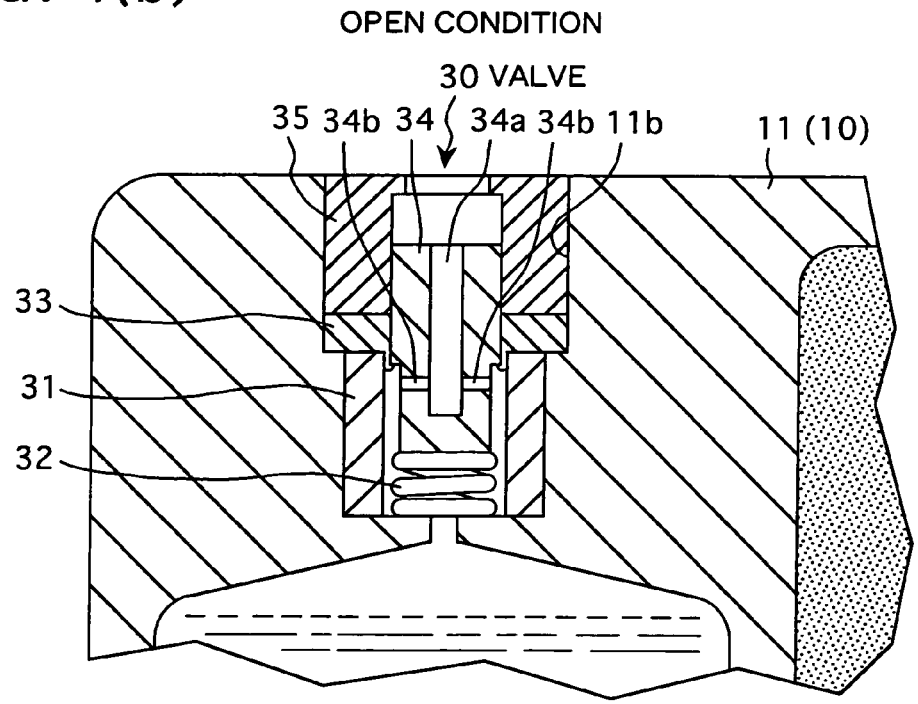
Figure 5:
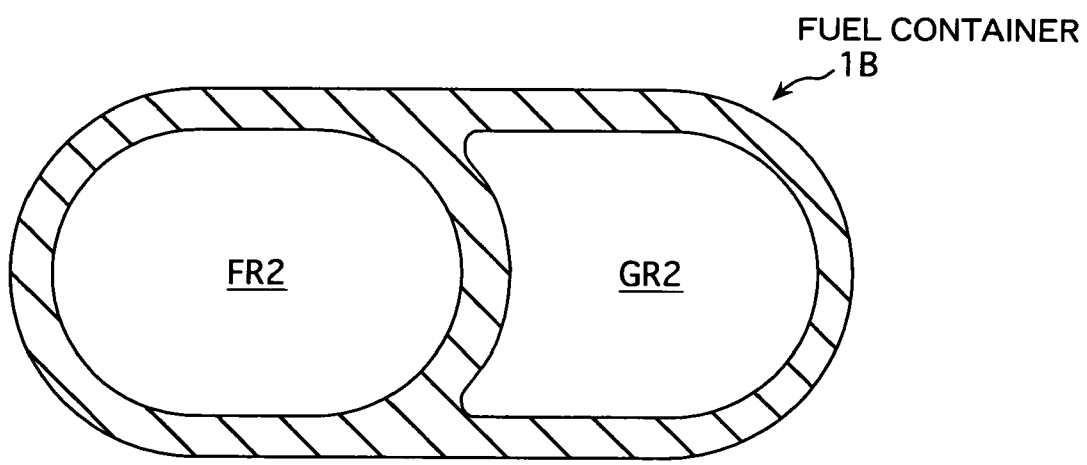
FIG. 5 is a sectional view of a fuel container for a fuel cell according to a modification of the embodiment.

In the accompanying drawings, FIG. 1 illustrates a premounted state of a fuel container for a fuel cell according to this embodiment, FIG. 2(a) is a plan view of the fuel container, FIG. 2(b) is a centrally sectional front view thereof, FIG. 3 is a sectional view taken on line X-X in FIG. 2(b), and FIGS. 4(a) and 4(b) illustrate on a larger scale a valve shown in FIG. 2(b), of which FIG. 4(a) shows a closed condition of the valve and FIG. 4(b) shows an open condition of the valve.

As shown in FIG. 1, the fuel container 1A for a fuel cell (simply "fuel container" hereinafter) according to this embodiment stores liquid fuel within a liquid fuel chamber FR1 (see FIG. 2(b)). The fuel container 1A is loaded to a portable remote terminal P (device) such as notebook-size personal computer, portable telephone, music/data read/write apparatus, electronic note, electronic dictionary, or watch, to supply liquid fuel to a DMFC installed in the portable remote terminal P.

The fuel container 1A of this embodiment is in the shape of a column having a generally elliptic section. For the convenience of explanation, width, thickness and height directions of the fuel container 1A are set as in FIG. 1.

As shown in FIG. 2(b), the fuel container 1A includes the container body 10, partition wall member 20, and valve 30.

(Container Body)

The container body 10 is in the shape of a column having a generally elliptic outline (see FIGS. 1 and 2(a)). The container boy 10 comprises a container body member 11 and a bottom lid member 12. The container body 10 is provided in the interior thereof with a cavity to be filled with liquid fuel and compressed gas. The container body 10 is further provided in the interior thereof with an inner wall 11a.

The inner wall 11a partitions the aforesaid cavity into a liquid fuel chamber FR1 into which liquid fuel is injected (stored) and a compressed gas chamber GR1 (push-out means accommodating chamber) into which compressed gas is sealed (stored), in an incomplete manner without completely isolating both chambers from each other, the compressed gas serving as means for forcing out the liquid fuel through the partition wall member 20. The liquid fuel chamber FR1 and the compressed gas chamber GR1 are arranged side by side in the width direction of the fuel container 1A and are in communication with each other through a communication path C formed on the bottom side (one end side). In other words, the liquid fuel chamber FR1 and the compressed gas chamber GR1 are offset (shifted) in mutually opposite directions from the center in the width direction.

Thus, since the liquid fuel chamber FR1 and the compressed gas chamber GR1 are disposed in a substantially separated state, the leakage of liquid fuel is difficult to occur against a shock such as falling of the container. Moreover, since the liquid fuel chamber FR1 and the compressed gas chamber GR1 are disposed side by side in the width direction, the fuel container 1A is short in its height direction (see FIG. 1) and thus can meet a high space efficiency requirement for the portable remote terminal P such as a notebook-size personal computer or PDA.

Further, as shown in FIG. 3, the liquid fuel chamber FR1 is circular in section and so is the partition wall member 20 which will be described later. Thus, with the partition wall member 20, the liquid fuel stored in the liquid fuel chamber FR1 can be discharged easily in a stable manner.

More specifically, the ratio between the liquid fuel chamber FR1 and the compressed gas chamber GR1 varies depending on the position of the partition wall member 20.

As the liquid fuel is consumed and the partition wall member 20 rises, part of the compressed gas chamber GR1 assumes a position under the liquid fuel chamber FR1.

In this embodiment the fuel container 1A is loaded to the portable remote terminal P which incorporates a DMFC and therefore the liquid fuel injected into the liquid fuel chamber FR1 is a mixed solution of methanol and pure water or ethanol and pure water. However, the type of liquid fuel is not limited thereto, but may be changed as necessary according to the type of the fuel cell concerned.

It is preferable that an oxygen-free gas such as nitrogen, carbon dioxide, or deoxidated air be used as the gas sealed into the compressed gas chamber GR1. With such an oxygen-free gas, oxygen, which exerts a bad influence on the reaction in the fuel cell can be prevented from being mixed into the liquid fuel and it is also possible to prevent oxidation of the liquid fuel.

The pressure of the compressed gas is not specially limited if only the liquid fuel injected into the liquid fuel chamber FR1 can be forced out or discharged completely even in a state in which the amount there of is small. In the case where the portable remote terminal P is provided with neither a fuel supply pump nor a pressure regulating mechanism, it is preferable to set the maximum pressure of the compressed gas at 0.3 MPaG or lower. In this case, the pressure of the compressed gas is set so as to be 0.3 MPaG in a state in which the amount of the liquid fuel injected is maximum (the volume of the liquid fuel chamber FR1 is maximum and that of the compressed gas chamber GR1 is minimum).

For minimizing a pressure variation of the compressed gas it is preferable that the volume of the compressed gas chamber GR1 be as large as possible.

In the container body member 11 is formed the connection port 11b for communication with the liquid fuel chamber FR1 from the exterior and connection to the fuel cell.

The container body member 11 is partially provided with a window portion 11c formed of a transparent material (see FIG. 1). Even when the fuel container 1A is left loaded to the portable remoter terminal P, it is possible to visually check the position of the partition wall member 20 and residual quantity of the liquid fuel through the window portion 11c. Further, scales 11d predetermined by a test or the like are attached to the window portion 11c, whereby the residual quantity of the liquid fuel can be visually checked in a more exact manner.

(Partition Wall Member)

The partition wall member 20 is accommodated within the container body 10 so as to be slidable in the height direction (see FIG. 1) and partitions the interior of the container body 10 into the liquid fuel chamber FR1 and the compressed gas chamber GR1.

The partition wall member 20 comprises a sealing member 21 and a core member 22. The sealing member 21 is integral with the core member 22 so as to cover the core member 22. According to this construction, the partition wall member 20 is slidable in the interior of the liquid fuel chamber FR1 of the container body 11 while retaining a predetermined attitude thereof.

The sealing member 21 is slidable while the peripheral surfaces of its upper and lower portions are in airtight contact with the inner surface of the container body 10.

The sealing member 21 comprises a sealing member body formed of a material having elasticity such as rubber and a low friction coating layer 21a formed as a thin film on an outer-surface side of the sealing member body. That is, the partition wall member 20 has a low friction surface on an outer surface side thereof (at least one of sliding surfaces of the container body and the partition wall member (a sliding surface on the container body side and a sliding surface on the partition wall member side)).

With this low friction coating layer, a frictional force induced between the partition wall member 20 and the container body 10 decreases, so that the partition wall member can slide in the interior of the container body 10 while undergoing little moving resistance caused by friction. That is, even if the pressure of the gas sealed into the compressed gas chamber GR1 is low, the partition wall member 20 can operate (slide) in the interior of the container body 10 and discharge the liquid fuel.

Since the low friction coating layer is formed of a material not dissolving out into the liquid fuel, there is no fear of dissolving-out of a low friction coating agent as an impurity into the liquid fuel.

As examples of such a low friction coating layer, mention may be made of a PTFE (Poly-tetrafluoroethylene) coating layer and a DLC (Diamond Like Carbon) coating layer.

With the PTFE coating layer, the coefficient of friction and frictional force induced between the sealing member 21 and the container body 10 become particularly low, with the result that the moving resistance of the partition wall member decreases.

The DLC coating layer forms a film on the surface of the sealing member body with use of methane gas by high-frequency plasma CVD, for example. This film forming process is called DLC coating. As to DLC coating, not only the thickness thereof can be controlled in high accuracy but also it is possible to effect a uniform treatment. Therefore, the coefficient of friction can be decreased while maintaining the airtightness with the sealing member 21.

(Valve)

The valve 30 is mounted to the connection port 11b to permit or shut off the flowing of liquid fuel. As shown in FIGS. 4(a) and 4(b), the valve 30 comprises a cylindrical spacer 31, a helical compression spring 32, a ring-like gasket 33, a valve stem 34 having a hollow portion 34a and a communication hole 34b, and a fixing member 35.

When the valve 30 is open as will be described later, the above components of the valve 30 come into direct contact with the liquid fuel. Therefore, it is preferable that the above valve components be formed of a non-metallic material such as PTFE or be coated with PTFE for example.

The helical compression spring 32 is guided by a spacer 31 disposed on a bottom periphery wall portion of the connection port 11b and is disposed on the bottom of the connection port 11b. The gasket 33 is disposed on the spacer 31. The valve stem 34 is inserted through the gasket 33 and is disposed on the helical compression spring 32. A threaded portion (not shown) is formed on the peripheral surface of the fixing member 35 and is threadedly engaged with a threaded portion (not shown) formed on the container body member 11. The fixing member 35 pushes the valve stem 34 to the bottom side of the connection port 11b against the helical compression spring 32.

When the fuel container 1A is not loaded to the portable remote terminal P, as shown in FIG. 4(a), the communication hole 34b of the valve stem 34 is cut off by the gasket 33 and the valve 30 is closed.

On the other hand, when the fuel container 1A is loaded to the portable remote terminal P, as shown in FIG. 4(b), the valve stem 34 is forced down, so that the gasket 33 is deformed to open the communication hole 34b (open condition). With the pressure of the gas sealed into the compressed gas chamber GR1, the liquid fuel injected into the liquid fuel chamber FR1 is ejected to the exterior of the fuel container 1A through the communication hole 34b and the hollow portion 34a. Thus, the liquid fuel can be supplied to a fuel cell (not shown) installed in the portable remote terminal P.

According to the fuel container 1A constructed as above, since the partition wall member 20 is in sliding contact with the container body 10 through the low friction surface, the partition wall member can slide even if the pressure of the compressed gas sealed in the compressed gas chamber GR1 is low, whereby the liquid fuel can be forced out.

Moreover, since the fuel container 1A does not use any lubricating oil, e.g., silicone oil, there is no fear of mixing of lubricating oil as an impurity into the liquid fuel. Thus, there is no fear, either, that the power generating function of the fuel cell may be deteriorated.

Further, although the fuel container 1A is for the supply of liquid fuel to the fuel cell installed in the portable remote terminal P, it is also employable as a fuel-injecting fuel container for injecting liquid fuel into a fuel container for a fuel cell capable of being re-loaded with fuel.

Although the present invention has been described above by way of a preferred embodiment thereof, the present invention is not limited to the above embodiment, but for example the following modifications may be made within the scope not departing from the gist of the present invention.

Although in the above embodiment the fuel container 1A has the liquid fuel chamber FR1 of a circular section (see FIG. 3), it may be substituted by a fuel container 1B having a liquid fuel chamber FR2 of an oblong (generally elliptic) section. The fuel container 1B can be made thinner in its thickness direction in comparison with the fuel container 1A and can be easily loaded to a thin portable remote terminal P (see FIG. 1) such as a thin notebook-size personal computer.

In case of adopting the liquid fuel chamber FR2, a thinner compressed gas chamber GR2 than the compressed gas chamber GR1 is adopted and the partition wall member 20 is also changed accordingly. In the case of the liquid fuel chamber FR2, the liquid fuel can be forced out more stably with the compressed gas because the partition wall member does not rotate in the circumferential direction.

Although in the fuel container 1A according to the above embodiment the liquid fuel chamber FR1 and the compressed gas chamber GR1 are disposed side by side in the width direction, the arrangement of both chambers is not limited thereto. For example, as shown in FIG. 6, there may be used an elongated fuel container 1C wherein a liquid fuel chamber FR3 and a compressed gas chamber GR3 are disposed in series (linearly) in the height direction.

Although in the above embodiment a low friction coating layer is formed on the surface of the sealing member 21, the present invention is not limited thereto. The low friction coating layer may be formed on the containing body member 11 or on both the sealing member 21 and the container body member 11.

Figure 6:
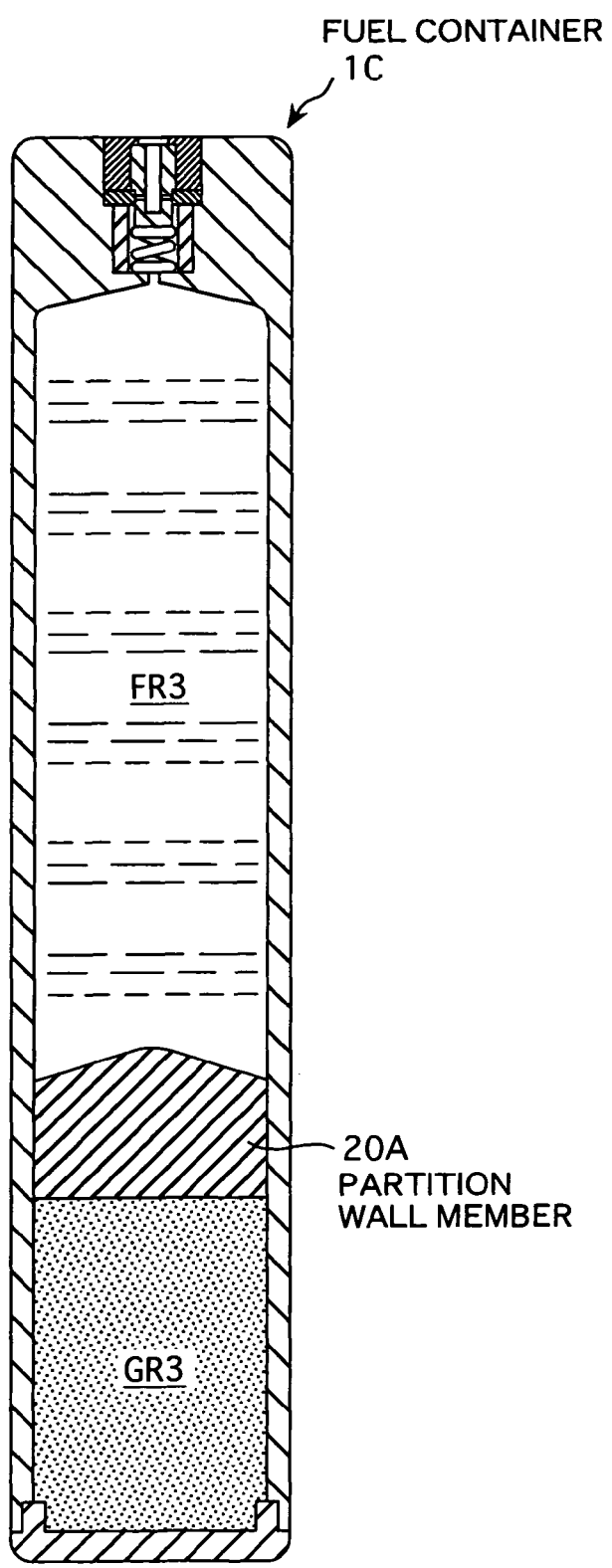
FIG. 6 is a centrally sectional front view of a fuel container for a fuel cell according to another modification of the embodiment.

Although in the above embodiment the partition wall member 20 is made to have a low friction surface by forming a low friction coating layer on the surface of the sealing member 21, there may be used a partition wall member 20A formed of PTFE, thereby making the partition wall member 20A have a low friction surface, as shown in FIG. 6.

Although in the above embodiment compressed gas is used as means for forcing out the liquid fuel, the means for forcing out the liquid fuel is not limited thereto. For example, the means in question may be a helical compression spring or the like.

The invention claimed is:

1. A fuel container for a fuel cell, comprising:
    a container body, which is provided with a liquid fuel chamber for storage of liquid fuel, the liquid fuel being a methanol aqueous solution or an ethanol aqueous solution, and a compressed gas chamber for accommodating an oxygen-free compressed gas, at least a major portion of the compressed gas chamber being arranged side-by-side with the liquid fuel chamber;
    a valve disposed in the container body to discharge or shut off the liquid fuel and having a portion configured to be connected with a fuel cell; and
    a partition wall member disposed slidably in the interior of the liquid fuel chamber,
    wherein the partition wall member partitions the interior of the container body into the liquid fuel chamber and the compressed gas chamber such that the compressed gas in the compressed gas chamber imparts a back pressure on the liquid fuel in the liquid fuel chamber via the partition wall member, and at least one of sliding surfaces of the liquid fuel chamber and the partition wall member is made of a material of a low frictional coefficient selected from the group consisting of polytetrafluoroethylene and diamond-like carbon not dissolving out into the liquid fuel, the sliding surface of the liquid fuel chamber and the partition wall member being free from lubricating oil.

2. A fuel container for a fuel cell according to claim 1, which is constructed so as to be loaded to a device with the fuel cell installed therein.

3. A fuel container for a fuel cell according to claim 1, wherein the valve is urged in the direction of a nozzle outlet by means of a spring.

4. A fuel container for a fuel cell according to claim 1, wherein the material of low frictional coefficient is coated onto the at least one sliding surface.

5. A fuel container for a fuel cell according to claim 4, wherein the material of low frictional coefficient is polytetrafluoroethylene.

6. A fuel container for a fuel cell according to claim 4, wherein the material of low frictional coefficient is diamond-like carbon.

7. A fuel container for a fuel cell according to claim 1, wherein the fuel chamber and at least a major portion of the compressed gas chamber are offset in mutually opposite directions from a center of the container body in a width direction of the container body.

8. A fuel container for a fuel cell, according to claim 1, wherein the container body has a transparent window through which a position of the partition wall member and a residual quantity of the liquid fuel in the fuel chamber may be visually checked.

* * * * *